July 10, 1962 W. SPILLMANN 3,043,763
HEAT TRANSFER SYSTEM FOR NUCLEAR POWER PLANT
Filed Sept. 22, 1959
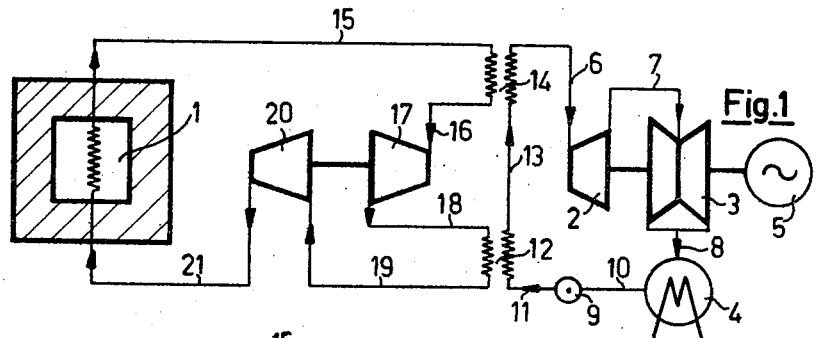
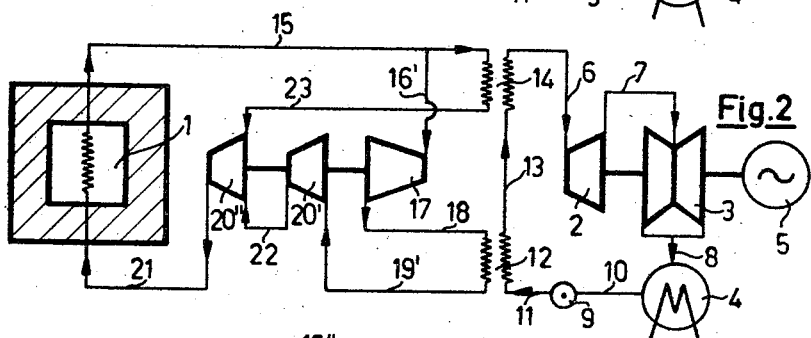
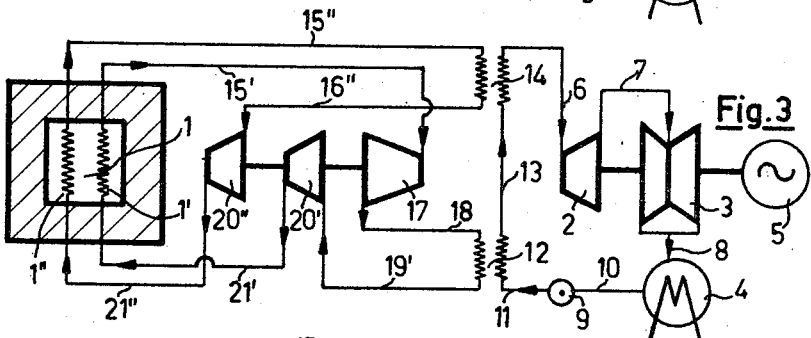
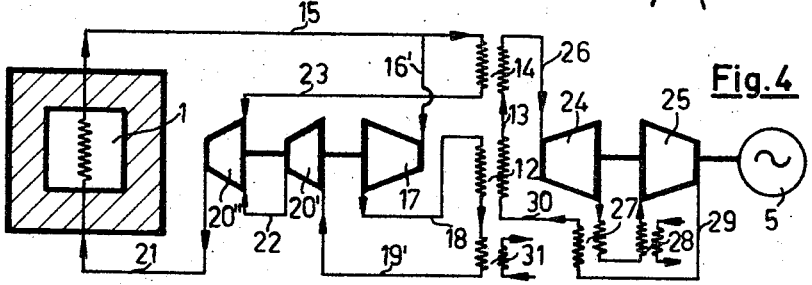
INVENTOR.
Werner Spillmann
BY Dodge and Sons
Attorneys United States Patent Office 3,043,763
Patented July 10, 1962

3,043,763
HEAT TRANSFER SYSTEM FOR NUCLEAR POWER PLANT
Werner Spillmann, Kilchberg, Zurich, Switzerland, assignor to Escher Wyss Aktiengesellschaft, Zurich, Switzerland, a corporation of Switzerland
Filed Sept. 22, 1959, Ser. No. 841,595
Claims priority, application Switzerland Oct. 7, 1958
5 Claims. (Cl. 204—193.2)

This invention relates to a heat transfer system for transferring heat generated in an atomic nuclear reactor to the working medium to be heated of a thermal power plant.

An installation of this kind is known in which this heat is transferred to the working meduim of a thermal power plant by a gaseous intermediate heat transfer medium passed in a circuit through the reactor. It is furthermore known to include, in a first circuit of gaseous intermediate heat transfer medium, a turbine operated by the gas heated in the reactor, the gas which leaves the turbine, before being re-compressed in a compressor, transferring heat to the working medium of the thermal power plant, which working medium passes through a second circuit. The turbine of the first circuit drives the said compressor and in addition provides useful power to the exterior.

In this installation, however, it is disadvantageous that on entering the heat-exchanger following the turbine of the first circuit, the gaseous intermediate heat transfer medium has a substantially lower temperature than on leaving the reactor. The working medium of the second circuit, therefore, can be heated to a correspondingly lesser degree, which reduces the thermodynamic efficiency of the second circuit. On the other hand, however, removal of heat in the case of the expanded gas of the first circuit is necessary, since otherwise the turbine power would not suffice to drive the compressor of the first circuit and cover the losses.

In an installaiton for utilising the heat generated in a nuclear reactor, in which this heat is transferred to the working medium of a thermal power plant by a gaseous intermediate heat transfer medium led through the reactor in at least one heat transfer circuit, and this circuit leads through a turbine and at least one compressor driven by this turbine, the aforesaid disadvantage is now obviated according to the invention by the fact that for the transfer of heat from the intermediate heat transfer medium to the working medium of the power plant, there is provided, in addition to a heat-exchanger through which passes the expanded gas leaving the turbine of the intermediate heat transfer circuit, also a heat-exchanger, which is connected downstream with reference to the working medium of the power plant, and through which flows the reactor-heated high-temperature medium of the intermediate heat transfer circuit.

This heat-exchanger, connected downstream on the working medium side, now provides the possibility of heating the working medium of the thermal power plant to a temperature which is almost equal to the outlet temperature of the intermediate heat transfer medium from the reactor, and differs from the latter temperature only by the temperature drop in the heat-exchanger necessary for the heat transfer.

Various embodiments of the subject of the invention are shown as examples in the drawing.

FIGURES 1, 2 and 3 show a steam power installation and FIGURE 4 a gas-turbine installation with closed circuit.

According to FIGURES 1 to 3, the heat produced in the nuclear reactor 1 is transmitted to the working medium of a steam power installation by means of a gaseous intermediate heat transfer medium. This steam power installation has a high-pressure turbine 2, a double-flow low-pressure turbine 3 and a condenser 4. The useful power of these turbines drives an electric current generator 5. The live steam passes through a pipeline 6 to the turbine 2 and thence through an overflow pipeline 7 to the turbine 3. The exhaust steam passes through a pipeline 8 to the condenser 4. The condensate is drawn by a pump 9 via a pipeline 10 and supplied as feed-water via a pipeline 11 to a heat-exchanger 12, and thence via a pipeline 13 to a heat-exchanger 14. In the heat-exchangers 12 and 14, heat is transmitted from the said gaseous intermediate heat transfer medium to the working medium of the power plant, in the present case therefore to the steam driving the turbines 2, 3. The feed-water supplied by the pump 9 is preheated, evaporated and possibly also superheated in the heat-exchangers 12, 14. The gaseous intermediate heat transfer medium is passed in a circuit through the reactor 1.

According to FIGURE 1, this circuit passes from the reactor 1 successively through a pipeline 15, the heat-exchanger 14, a pipeline 16, a turbine 17, a pipeline 18, the heat-exchanger 12, a pipeline 19, a compressor 20 driven by the turbine 17 and a pipeline 21 back to the reactor 1. The compressed gaseous intermediate heat transfer medium, heated in the reactor 1 to a high temperature, transfers heat first in the heat-exchanger 14 to the working medium of the turbines 2, 3, then expands in the turbine 17 and thereupon in the heat-exchanger 12 again transfers heat to the working medium of the steam power plant. After being cooled in the heat-exchanger 12, it is brought to the original pressure in the compressor 20 and led again to the reactor 1 for being heated. The circuit of the intermediate heat transfer medium is so arranged that the machine group 17, 20 is in power equilibrium. For starting the group, a starting motor is of course necessary, but for the sake of simplicity, this is not shown.

With reference to the working medium of the steam turbines 2, 3, the heat-exchanger 14 is connected downstream of the heat-exchanger 12. Since the compressed gas, heated in the nuclear reactor 1, of the intermediate heat transfer circuit passes through it, it is possible to heat the working medium of the thermal power installation almost to the temperature of the intermediate heat transfer medium leaving the nuclear reactor 1.

According to FIGURE 2, only a part of the compressed gaseous intermediate heat transfer medium heated in the reactor 1 is supplied through the pipeline 15 to the heat-exchanger 14. The remainder passes through a pipeline 16', branching off the pipeline 15, directly to the turbine 17, and after expansion in this turbine gives off heat in the heat exchanger 12 in the same way as in FIGURE 1.

For re-compressing and circulating the gaseous intermediate heat transfer medium two compressors 20' and 20'', however, are now provided. The quantity of expanded intermediate heat transfer medium leaving the heat-exchanger 12 is supplied through a pipeline 19' to the compressor 20', where it is compressed substantially to the pressure of the portion leaving the heat-exchanger 14. The two quantities are then supplied through the pipelines 22 and 23 to the inlet side of the compressor 20'', which substantially has only to overcome the pressure losses in the reactor 1 and in the heat-exchanger 14. From the compressor 20'', the total quantity of intermediate heat transfer medium is then returned to the reactor 1 via the pipeline 21. Advantageously, the machines and heat-exchangers are so arranged that the two portions flow to the compressor 20'' at the same temperature.

The arrangement according to FIGURE 3 differs from that according to FIGURE 2 in that the portions of the heat transfer medium passing through the two heat-exchangers describe completely separate circuits. One portion is heated in a reactor flow path 1', supplied via a pipeline 15' to the turbine 17 and, after expansion in this turbine, passes via the pipeline 18 to the heat-exchanger 12. Thence, it is supplied via the pipeline 19' to the compressor 20' and finally through a pipeline 21' back to the reactor path 1'. The other portion is heated in a reactor flow path 1'', then passes via a pipeline 15'' to the heat-exchanger 14 and thence via a pipeline 16'' to the compressor 20'', whereupon the circuit is closed via a pipeline 21'' returning to the reactor path 1''. In this case also, the high-temperature gas of the intermediate heat-carrier circuit heated in the reactor passes through the heat-exchanger 14. With these separate circuits there is no need of using the same heat transfer medium for both circuits.

In the installation shown in FIGURE 4, the generator 5 is driven by a closed-cycle gas-turbine installation with a turbine 24 and a compressor 25. The compressed working gas flows, in the same way as the working medium of the installations according to FIGURES 1, 2, 3, successively through the heat-exchangers 12 and 14. The heated working gas passes via a pipeline 26 to the turbine 24 and after expansion in this turbine is supplied via a heat-exchange 27 and a cooler 28 to the suction side of the compressor 25. After compression, it is then returned via a pipeline 29 to the heat-exchanger 27, in which it takes up heat from the expanded working gas and is finally returned via a pipeline 30 to the heat-exchanger 12.

The arrangement of the circuit of the intermediate heat transfer medium corresponds substantially to that according to FIGURE 2. The various parts of this circuit are therefore provided in FIGURE 4 with the same reference numerals as in FIGURE 2. In FIGURE 4, however, there is also shown an additional heat-exchanger 31, inserted in the circuit of the intermediate heat transfer medium between the pipelines 18 and 19' after the heat-exchanger 12. The purpose of this heat-exchanger is to supply useful heat, for example for heating purposes, to another medium and permits the intermediate heat transfer medium to be cooled to a lower temperature than the temperature of the working gas of the gas turbine installation 24, 25 passing to the heat-exchanger 12.

Of course, in connection with a gas-turbine installation another intermediate heat transfer circuit, coming within the scope of the invention, could be provided, such as for example one of the circuits shown in FIGURE 1 or 3, with or without the heat-exchanger 31.

In the installations shown, the turbine 17 and the compressor 20 or the compressors 20', 20'' are in power equilibrium with each other, that is to say, they require no driving power from the outside nor do they supply useful power to the outside. All the heat absorbed from the reactor by the intermediate heat transfer medium is thus transferred to the working medium of the thermal power plant and any other useful heat receiver.

What is claimed is:

1. A heat transfer system for transferring heat generated in an atomic nuclear reactor to the working medium of a thermal power plant, comprising first and second heat exchangers located outside the reactor, each heat exchanger having two flow paths for heat exchanging media; a power plant circuit including one of the flow paths of each heat exchanger and arranged to lead the working medium in series through the first heat exchanger and then through the second heat exchanger; a turbine; a compressor driven by the turbine; a first heat transfer circuit including flow connections for leading a gaseous heat exchange medium in series through a flow path in the reactor in which the medium may absorb heat generated in the reactor, the turbine, the other of said flow paths of the first heat exchanger, the compressor and back to the flow path in the reactor; a second heat transfer circuit including flow connections for leading a gaseous heat exchange medium in series through a flow path in the reactor in which the medium may absorb heat generated in the reactor, the other of said flow paths of the second heat exchanger, and back to the flow path in the reactor; means in the second heat transfer circuit for circulating a gaseous medium through the circuit; and gaseous heat exchange medium in said first and second circuits.

2. The heat transfer system defined in claim 1 in which the means for circulating gaseous medium in the second circuit comprises a second compressor driven by the turbine, the flow connections of the second circuit being arranged to lead the gaseous medium leaving the second heat exchanger through the second compressor before returning it to the reactor flow path.

3. The heat transfer system defined in claim 2 in which the two heat exchange circuits are separate.

4. The heat transfer system defined in claim 2 in which the two heat exchange circuits employ a common flow path through the reactor.

5. The heat transfer system defined in claim 4 in which the first heat exchange circuit includes flow connections which lead the gaseous heat exchange medium leaving the first compressor through the second compressor before returning it to the reactor flow path.

References Cited in the file of this patent
FOREIGN PATENTS
1,151,015     France _____ Aug. 19, 1952